(No Model.)
J. E. BEACH.
THRASHING MACHINE.
No. 427,660.　　　　　　　Patented May 13, 1890.
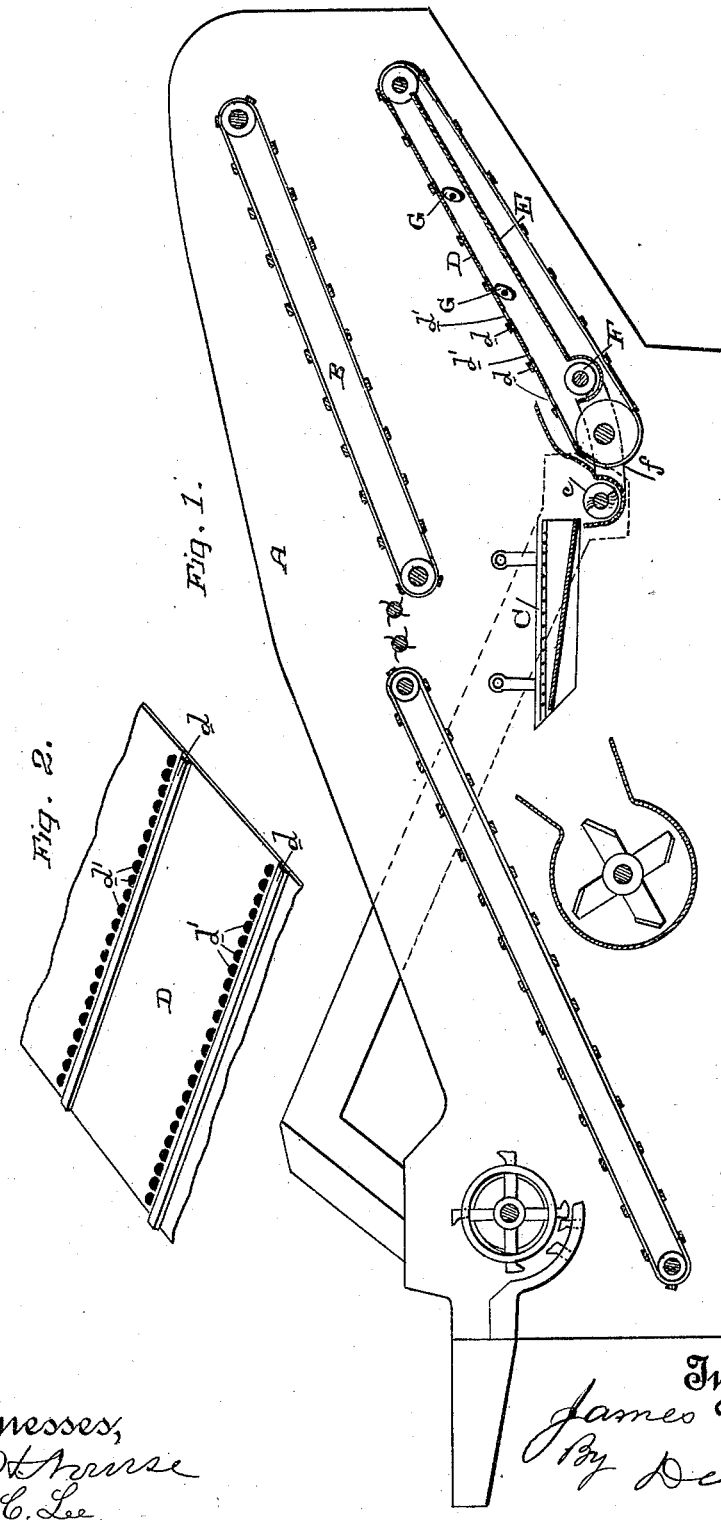

UNITED STATES PATENT OFFICE.

JAMES E. BEACH, OF ROUTIER, CALIFORNIA.

THRASHING-MACHINE.

SPECIFICATION forming part of Letters Patent No. 427,660, dated May 13, 1890.

Application filed October 28, 1889. Serial No. 328,454. (No model.)

*To all whom it may concern:*

Be it known that I, JAMES E. BEACH, a citizen of the United States, residing at Routier, Sacramento county, State of California, have invented an Improvement in Thrashing-Machines; and I hereby declare the following to be a full, clear, and exact description of the same.

My invention relates to the class of thrashers; and it consists in the constructions and combinations of devices which I shall hereinafter describe and claim.

Referring to the accompanying drawings for a more complete explanation of my invention, Figure 1 is a skeleton sectional view of a thrasher, showing my attachment. Fig. 2 is a perspective of a portion of carrier D.

A represents the frame of any ordinary thrasher, the essential features of which need no detailed description, it being sufficient to refer to the usual straw-carrier B and the usual shoe C.

To save the grain which is blown off from the shoe, and also to carry the chaff to the same dump as the straw, I have mounted in the frame of the machine the endless carrier D. This is a belt mounted upon suitable rollers or drums within the frame and is adapted to be driven by any suitable mechanism connected with the general driving mechanism of the entire machine. The carrier-belt is located at a point just back of the shoe, its lower end being just behind the conveyer c, into which the shoe delivers such grain as will not pass through its riddles, and has therefore to be carried back in the elevator to go through the machine again. The upper end of the carrier is extended so as to dump its load in substantially the same place as does the straw-carrier above. The carrier-belt D is provided with the usual cross-slats $d$, and is perforated directly in front of each slat, as shown, by the holes $d'$, which are in rows across the carrier and are preferably semicircular in shape.

Between the folds of the carrier-belt D is the inclined directing-board E, the lower end of which extends downwardly to and is in communication with a second conveyer F, one end of which is connected by a chute $f$ with the end of the first conveyer or the base of the elevator.

Transversely mounted in the frame are the shaker-shafts G, which I have here shown as two in number. They lie directly over the directing-board and under the upper fold of the carrier-belt D, and are adapted in rotating to strike said belt, and thereby agitate it, so that the grain on its surface has a better chance of passing through its perforations. These shaker-shafts are adapted to be rotated by suitable mechanism, unnecessary herein to describe.

The operation of the attachment is as follows: The chaff and such grain as still clings to it are blown off of the shoe and over its receiving-auger and onto the lower end of the carrier-belt D. By this it is carried upwardly, the grain disengaging itself and passing through the perforations of the belt, being assisted by the shaking movement to which the belt is subjected, and said grain, falling upon the directing-board beneath the carrier, runs down and into the second conveyer F, from which it is directed into the elevator to go through the machine again, as usual. The straw and chaff are carried up over the end of the carrier and discharged in substantially the same pile as the straw from the main straw-carrier above.

Having thus described my invention, what I claim as new, and desire to secure by Letters Patent, is—

1. In a thrashing-machine, and in combination with its shoe, the traveling carrier-belt mounted in the frame of the machine, with its lower end adapted to receive the chaff and grain blown off the shoe, said carrier-belt having cross-slats, with perforations in its surface directly in front of each slat for allowing the grain to pass through, and directing devices under said belt for carrying the grain back to the elevator, substantially as herein described.

2. In a thrashing-machine, and in combination with its shoe, the traveling carrier-belt provided with cross-slats and having its lower end adapted to receive the grain and chaff blown from the shoe, said carrier-belt having perforations directly in front of each slat to permit the grain to drop through it, the imperforate inclined directing-board under the carrier, the supplementary conveyer at the base of the board, and the chute of said conveyer, whereby the grain is delivered to the elevator, substantially as herein described.

3. In a thrashing-machine, a grain-saving attachment consisting of an endless traveling carrier-belt mounted in the frame of the machine, with its lower end adapted to receive the chaff and grain blown from the shoe of the thrasher and its upper end extending backwardly to the rear of the machine, said carrier-belt having cross-slats and semicircular perforations in front of its slats, the shaker-shafts mounted under the carrier-belt for agitating it, the inclined directing-board under said belt, and the supplementary conveyer at the base of the board, and the spout $f$, connecting the supplementary conveyer with the elevator, all arranged and adapted to operate substantially as herein described.

In witness whereof I have hereunto set my hand.

J. E. BEACH.

Witnesses:
W. H. WILLIAMSON,
J. O. PATTERSON.